No. 872,526.  
PATENTED DEC. 3, 1907.  
C. G. LOTAVE.  
PROTECTED PNEUMATIC TIRE.  
APPLICATION FILED FEB. 11, 1907.

2 SHEETS—SHEET 1.

Witnesses:  
G. Sargent Elliott  
Adella M. Fowle

Inventor:  
Carl G. Lotave,  
By  
H. S. Bailey, Attorney

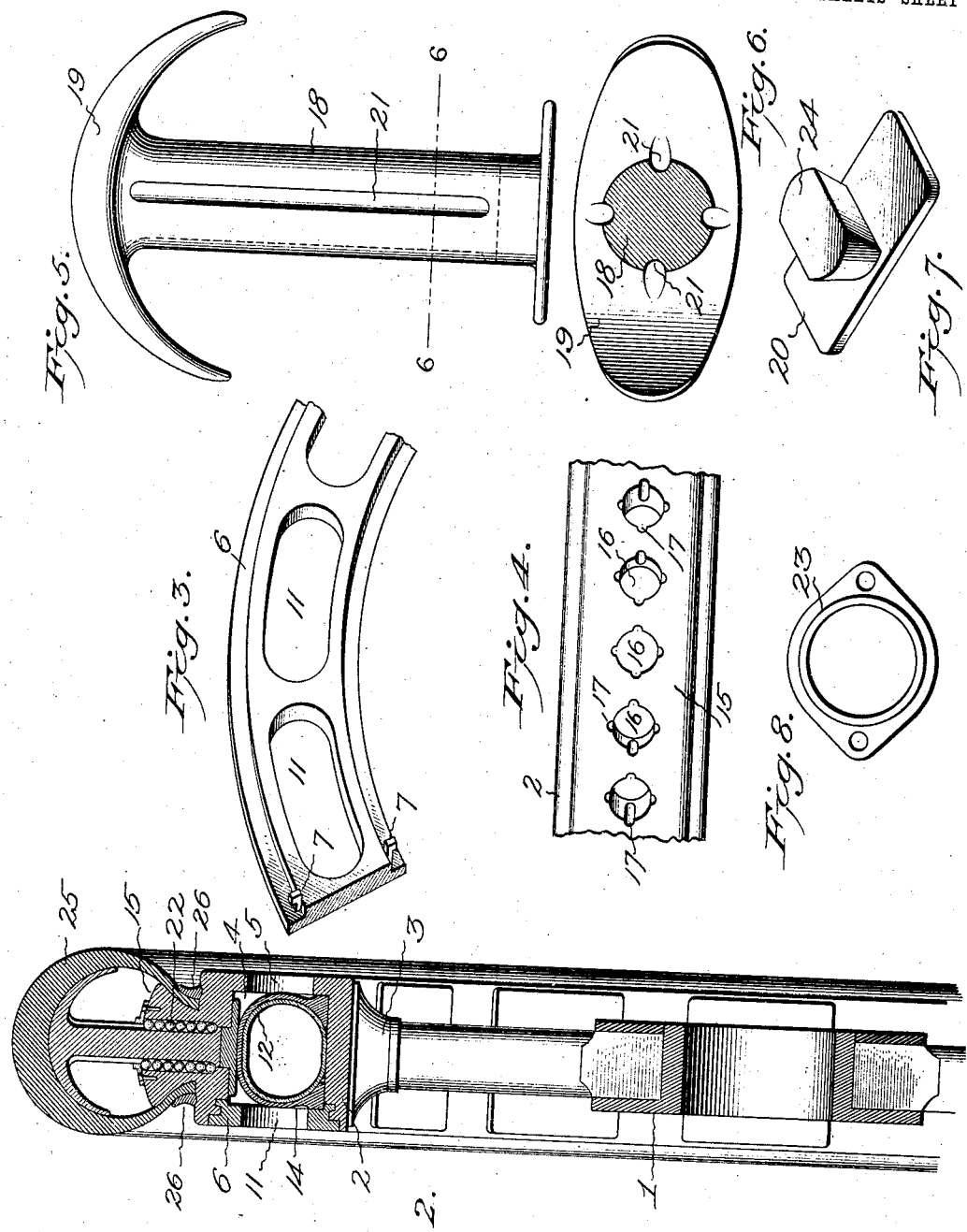

UNITED STATES PATENT OFFICE.

CARL G. LOTAVE, OF DENVER, COLORADO, ASSIGNOR OF ONE-HALF TO EDWIN R. COOPER, OF DENVER, COLORADO.

PROTECTED PNEUMATIC TIRE.

No. 872,526.     Specification of Letters Patent.     Patented Dec. 3, 1907.

Application filed February 11, 1907. Serial No. 356,818.

*To all whom it may concern:*

Be it known that I, CARL G. LOTAVE, a citizen of the United States of America, residing at the city and county of Denver and State of Colorado, have invented a new and useful Protected Pneumatic Tire for Automobile and other Wheels, of which the following is a specification.

My invention relates to improvements in tires for the wheels of automobiles, and other vehicles.

The object of this invention is to provide a specially constructed wheel having a tire combining all the requirements of a tire of this character, and which is not rendered inoperative as a result of punctures. Further, to provide a tire the efficiency of which is not diminished as the result of punctures, and which is held in an expanded condition by a pneumatic tube which is protected against the possibility of being punctured, and which can be removed or replaced without disturbing the tire.

The invention further consists in the manner of holding a tire in an expanded condition by a plurality of plungers, which bear against the inner periphery of the tire and upon a protected pneumatic tube, whereby the tire is held under the desired expansive tension.

The various details of construction by which these objects are accomplished, are fully set forth in the accompanying specification and claims.

In the accompanying drawings Figure 1, is a side elevation, partly in section, of a portion of an automobile wheel constructed in accordance with my invention. Fig. 2, is a vertical, transverse, sectional view thereof. Fig. 3, is a perspective view of a portion of the circular ring or plate which confines the pneumatic tube within its pocket. Fig. 4, is a plan view of a portion of the wheel felly, showing the apertures through which the tire supporting plungers pass. Fig. 5, is a side elevation of one of the tire-supporting plungers. Fig. 6, is a sectional view through the stem of the plunger, on the line 6—6 of Fig. 5. Fig. 7, is a perspective view of the removable foot which is secured to the inner end of each plunger. Fig. 8, is a plan view of one of the ball retaining rings which encircle the plungers and are secured to the felly. And Fig. 9, is a transverse, sectional view through a portion of the wheel felly, showing the manner of locking the ring to the pneumatic tube pocket, and also shields which cover openings through the ring, and in the bottom of the pocket, which permit lateral bulging of the tire under pressure, but prevent puncturing of the same.

Referring to the accompanying drawings, the numeral 1, indicates the hub of a specially-constructed wheel, and 2, the felly thereof, which is preferably metal, of a suitable character, and is cast with spoke sockets 3, in which the outer ends of the spokes are secured, the inner ends being secured to the hub in the usual manner. The felly of the wheel is formed with a circular channel or pocket 4, which extends into the felly from one side, and the bottom of this pocket is formed with a plurality of elongated openings or apertures 5. A removable ring or band 6, forms the opposite side of the pocket, and this ring is provided with integral lugs 7, having hooked ends, which enter key-hole slots 8 in the felly, having projecting lips or keepers 9, behind which the hooked ends of the lugs will pass, when the ring is given a slight turn. These lugs are arranged in pairs, as shown in Fig. 9, three or four of the pairs positioned at equi-distant points around the ring being sufficient, and when the ring is placed over the pocket, with its lugs entering the key-hole slots 8, and is given a slight turn, the ring will be locked to the felly in the manner above described, and to prevent the accidental displacement of the ring, a screw 10, is passed through the ring and into the felly, whereby the ring will be prevented from turning. The ring is provided with elongated openings or apertures 11, which alternate in position, with respect to the openings 5 in the pocket 4, as shown in dotted lines Fig. 1, and these openings not only reduce the weight of the felly, but serve another function to be presently mentioned.

Within the pocket 4, is housed a pneumatic tube 12, of the style commonly employed in connection with tires in present use, and this tube is provided with the usual inflating tube 13; around the tube 12, is placed an outer tube 14, which is stout and strong, and which entirely incloses the tube 12, this tube 14, being open all the way around its inner surface as shown in Fig. 2, so that the pneumatic tube may be inserted, as will be readily understood.

The felly is formed with a circumferential bead or rim 15, which extends entirely around it; and which is wider at its outer extremity than where it unites with the felly, thus giving an under-cut form to the sides of the rim, for a purpose to be presently explained.

Around the periphery of the rim, at equi-distant points, are formed radial apertures 16, which extend through the rim and felly, and into the felly pocket 4. These apertures are circular, and preferably but a slight distance apart, and each aperture has four vertically disposed, semi-circular grooves 17, formed in its periphery, which extend from the outer end of the aperture to within a short distance of its inner end, as shown, and within each aperture 16, is placed a plunger 18, comprising a stem portion, the outer end of which terminates in a crescent-shaped head 19, while its inner end extends into the felly pocket 4, and is provided with a removable foot 20, which rests upon the tube 14 surrounding the pneumatic tube 12. At points coincident with the grooves 17 of the apertures 16, the plunger stems are provided with semi-circular grooves 21, and each adjacent pair of grooves 17—21 forms a ball well, which is filled with bearing balls 22, as shown in the drawings. A cap 23, having an opening through which the plunger stem passes, is secured to the rim, over the ball wells of each aperture 16, and these caps serve to retain the balls within their wells. Each plunger foot 20, is formed with a wedge-shaped lug 24, which fits within a correspondingly-shaped groove in the end of the stem, and these feet are removed, as will be apparent, when a stem is inserted in the rim or withdrawn therefrom.

The plungers 18, are inclosed within a tire 25, of the usual construction, the loose edges of which lie against the under-cut sides of the rim 15, as clearly shown in Fig. 2, and the tire is secured to the rim by clenchers 26, which may be of any preferred type, and which form no part of my present invention. The under-cut sides of the rim, in conjunction with the clenchers, securely hold the edges of the tire, which are preferably wedge-shaped in cross section as shown.

When the tube 12 is inflated with air under the desired pressure, the plungers will be forced out, so that their crescent-shaped heads will bear against the inner periphery of the tire 25, and thus hold its bearing surface under the required degree of tension, the outline of the tire being conformed to the shape of the plunger heads, and as the plungers are positioned close together, their heads will support practically the entire tread surface of the tire so that as the tire contacts with the road, the space between the plunger heads being so short, no flat surfaces will result upon the tread of the tire, and the wheel will run as smoothly as when provided with the usual form of pneumatic tire. As the wheel revolves, the several plungers immediately operated by the contacting portion of the tire with the road, will be forced in to a greater or less extent, according as the pressure upon them is direct or otherwise, and the balls 22 will prevent binding of the plungers in the apertures 16, as the movement of the wheel shifts the pressure from a direct line with their radial movement to a line at an angle with their movement.

As the tubes 12 and 14 are compressed by the plungers, they must necessarily bulge laterally, and to accommodate this bulging, the felly and the ring 6 are provided with the openings 5 and 11 respectively, and in order to prevent puncturing of the tire through these openings 5 and 11, rings may be employed composed of any suitable light sheet metal, in which are formed a number of concavities 27, corresponding to the number of the openings in the ring 6, and in the felly, and these rings are placed upon the inside of the ring 6, and of the felly, so that the concave portions will lie within the openings of the ring 6, and within those of the felly, as plainly shown in Fig. 9, thus affording ample space to accommodate the bulged tubes, and at the same time preventing the tubes from being punctured.

In assembling the parts, the foot of each plunger is removed, and a cap 23 slipped upon the stem of the plunger, and the stem is then inserted in one of the apertures 16, until it enters the pocket 4 in the felly. The foot is then replaced upon the end of the stem, the plunger is turned to the position shown in Fig. 2, when its grooves 21, will register with the grooves 17 of the apertures 16, thus forming the wells for the bearing balls 22. These wells are then filled with the balls, and the cap 23 is screwed to the rim 15. When all the plungers have been thus arranged, the pneumatic tube 12 is placed with the outer tube 14, and these tubes placed within the pocket 4 of the felly; the ring 6, is then secured upon the side of the felly over the pocket in the manner before described, and the tire 25 is placed over the plungers and secured to the rim 15 by the clenchers 26. The pneumatic tube 12 is then inflated, thereby forcing out the plungers, which expand the tire and hold it in an expanded condition and the wheel is then ready for use. As the tire contacts with the ground when the wheel is in motion, the plungers immediately in the line of pressure are pressed against the air tube, which cushions their movement and instantaneously restores them to their extended positions, when the contact pressure from without is removed, thereby affording the same amount of resiliency as is secured in tires as at present employed. The efficiency of the outer tire is not lessened by a puncture or by several punctures, and the pneumatic tire is so completely housed and protected that the chances of its being punctured are practically impossible.

The wheel and tire as illustrated in the accompanying drawings, embody the essential features of my invention, but many modifications in the construction of the various parts may be employed without departing from the spirit of the invention.

Having fully described my invention, what I claim as new, and desire to secure by Letters Patent, is:

1. The combination with a wheel having a hollow felly, provided with elongated openings in one side, a removable side to said felly having elongated openings, and means for locking said side to said felly, of a pneumatic tube in said felly, a hollow tire removably secured to a projecting rim of said felly, and plungers extending through radial apertures in said rim, and resting upon the pneumatic tube, their outer ends extending into and bearing against the inner periphery of the tire.

2. The combination with a wheel having a hollow felly, provided with a projecting, under-cut rim, of a pneumatic tube in said felly; a hollow tire secured upon the rim of said felly; plungers comprising stems having semi-circular heads which extend into said tire, said stems extending through radial apertures in said rim, and being provided with removable feet which rest upon the pneumatic tube; anti-friction bearing balls in the rim in contact with said plunger stems, and caps for preventing the escape of said balls.

3. The combination with a wheel, having a hollow felly, a pneumatic tube in said felly, and a hollow tire removably secured to said felly, of plungers having stems which extend through radial slots in the felly rim and rest upon the pneumatic tube, and semi-circular heads which extend into the tire, said stems being formed with semi-circular, longitudinally-disposed grooves, which register with similar grooves in the side of the radial apertures to form pockets; anti-friction balls in said pockets, and caps surrounding the stems and secured to the rim for retaining the balls.

4. The combination with a wheel having a hollow felly, one side of which is removable and is provided with elongated openings, the fixed side being provided with like openings, of a pneumatic tube in said hollow felly; a hollow tire removably secured to said felly; plungers resting on said pneumatic tire and extending through radial apertures in the felly rim, and into the tire; anti-friction balls in contact with said plungers, and circular plates formed with concavities which fit into the elongated openings in the sides of the felly, and permit bulging of the pneumatic tube.

In testimony whereof I affix my signature in presence of two witnesses.

CARL G. LOTAVE.

Witnesses:
G. SARGENT ELLIOTT,
ADELLA M. FOWLE.